US008266491B2

(12) United States Patent
Lee et al.

(10) Patent No.: US 8,266,491 B2
(45) Date of Patent: Sep. 11, 2012

(54) APPARATUS AND METHOD FOR CONTROLLING A HYBRID AUTOMATIC REPEAT REQUEST OPERATION IN A WIRELESS MOBILE COMMUNICATION SYSTEM

(75) Inventors: Mi-Hyun Lee, Seoul (KR); Jae-Weon Cho, Suwon-si (KR); Ho-Kyu Choi, Seongnam-si (KR); Jeong-Ho Park, Seoul (KR); Jun-Sung Lim, Seongnam-si (KR); Su-Ryong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 804 days.

(21) Appl. No.: 12/433,564

(22) Filed: Apr. 30, 2009

(65) Prior Publication Data
US 2009/0276676 A1 Nov. 5, 2009

(30) Foreign Application Priority Data

Apr. 30, 2008 (KR) .................. 10-2008-0040638

(51) Int. Cl.
*G06F 11/00* (2006.01)
(52) U.S. Cl. ...................... 714/749; 714/748
(58) Field of Classification Search .................. 714/749, 714/750; 370/278, 282
See application file for complete search history.

(56) References Cited

U.S. PATENT DOCUMENTS

| | | | | |
|---|---|---|---|---|
| 7,809,092 B2* | 10/2010 | Chang et al. | ................... | 375/341 |
| 7,945,258 B2* | 5/2011 | Sollenberger et al. | ........ | 455/423 |
| 8,130,682 B2* | 3/2012 | Jalloul et al. | ................... | 370/281 |
| 2006/0039299 A1 | 2/2006 | Ihm et al. | | |
| 2006/0195767 A1 | 8/2006 | Ihm et al. | | |
| 2007/0300120 A1 | 12/2007 | Kim et al. | | |
| 2010/0042881 A1* | 2/2010 | Wong | ............................ | 714/748 |
| 2010/0223522 A1* | 9/2010 | Duggan | ........................ | 714/748 |

* cited by examiner

*Primary Examiner* — Dieu-Minh Le
(74) *Attorney, Agent, or Firm* — Jefferson IP Law, LLP (57) ABSTRACT

An apparatus and method for controlling a Hybrid Automatic Repeat reQuest (HARQ) operation in a transmitter of a wireless mobile communication system using each frame constituted by a plurality of subframes are provided. In the method for controlling an HARQ operation, indication information indicating a subframe position where transmission of a data burst starts and the number of subframes required for transmission of the data burst is transmitted to a receiver through an i-th frame. When the number of subframes does not exceed a threshold, it is determined that the data burst at the subframe position indicated by indication information of an (i+1)-th frame is retransmitted to the receiver. When the number of subframes exceeds the threshold, it is determined that the data burst at the subframe position indicated by indication information of an (i+n)-th frame, where n is a positive integer exceeding 1, is retransmitted to the receiver.

28 Claims, 8 Drawing Sheets

APPARATUS AND METHOD FOR CONTROLLING A HYBRID AUTOMATIC REPEAT REQUEST OPERATION IN A WIRELESS MOBILE COMMUNICATION SYSTEM

PRIORITY

This application claims the benefit under 35 U.S.C. §119(a) of a Korean patent application filed in the Korean Intellectual Property Office on Apr. 30, 2008 and assigned Serial No. 10-2008-0040638, the entire disclosure of which is hereby incorporated by reference.

BACKGROUND OF THE INVENTION

1. Field of the Invention

The present invention relates to a wireless mobile communication system. More particularly, the present invention relates to an apparatus and method for transmitting and receiving a signal on the basis of Hybrid Automatic Repeat reQuest (HARQ) in a wireless mobile communication system.

2. Description of the Related Art

Wireless mobile communication systems are being developing to provide various services such as broadcasting, multimedia video, multimedia message services, etc. In particular, next-generation wireless mobile communication systems are being developed to provide a data service of at least 100 Mbps to users moving at high speed and to provide a data service of at least 1 Gbps to users moving at low speed.

The above-described wireless mobile communication systems require the reduction of system overhead and short latency so that a base station and a mobile station can transmit and receive data reliably and at high speed. A synchronous HARQ may be considered as one method for reducing the system overhead and supporting short latency. Since initial transmission and subsequent retransmission are performed according to a predefined cycle, the synchronous HARQ has a regular retransmission delay. Accordingly, the synchronous HARQ has a given correspondence relation between initial transmission timing and retransmission timing. This correspondence relation is called HARQ interlace. That is, the HARQ interlace indicates that a relation between a time slot in which resource allocation information (that is, a MAP message) indicating resources allocated to data transmission and a time slot in which data is transmitted according to the MAP message, a relation between a time slot in which the data is transmitted and a time slot in which a feedback corresponding to the data is transmitted, and a relation between a time slot in which the feedback is transmitted and a time slot in which data corresponding to the feedback is transmitted or retransmitted are prescribed regularly.

In a wireless mobile communication system using the above-described HARQ scheme, a transmitter transmits a signal including data and then a receiver transmits a positive response (i.e. ACKnowledge (ACK)) or a negative response (i.e. Not ACKnowledge (NACK)) to the transmitter according to whether the data has been received normally. The transmitter end transmits new data according to the reception of ACK or NACK or retransmits previously transmitted data according to the HARQ. Here, the HARQ scheme indicates a Chase Combining (CC) or Incremental Redundancy (IR) scheme. As described above, the HARQ scheme results in time delays such as a transmission delay when the transmitting end transmits new data according to the reception of ACK after data transmission and a retransmission delay when the transmitter retransmits the data according to the reception of NACK after data transmission.

When the retransmission delay is maintained regularly in the communication system using the above-described HARQ scheme, the base station may use a continuous allocation method. The continuous allocation method enables the mobile station to repeatedly use first allocated resources at the same position within each frame during a given time interval, thereby omitting the transmission of a control message indicating resource allocation at each data transmission or retransmission time or reducing the number of control message transmissions. However, a delay time due to the retransmission delay may vary with a ratio between the number of DownLink (DL) time slots and the number of UpLink (UL) time slots. Here, the time slot indicates a unit of resource allocation determined by a predetermined time interval and/or frequency band.

In contrast, the communication system must support the transmission of various types of data bursts according to a service state or capability of the base station or mobile station. For example, when a channel state is good for at least a predetermined standard, a data burst of at least a predetermined size is transmitted during a relatively long transmission interval to satisfy a high data rate. When the channel state is bad for less than the predetermined standard, a data burst of less than the predetermined size is transmitted during a relatively long transmission interval to ensure robust data burst transmission.

A node having low processing capability requires a relatively long processing time at the time of signal transmission/reception, and a node having high processing capability requires a relatively short processing time for signal transmission/reception. Here, the processing time may be a reception processing time required to demodulate and decode received data so that the receiver feeds back a result of error detection for the received data and a transmission processing time required to perform scheduling/encoding so that the transmitter retransmits/initially transmits after detection of ACK/NACK.

Therefore, there is a need for an adaptive HARQ interlace method capable of processing a signal by considering various situations such as various lengths of data burst transmission intervals, capabilities of a base station and a mobile station, etc.

SUMMARY OF THE INVENTION

An aspect of the present invention is to address at least the above-mentioned problems and/or disadvantages and to provide at least the advantages described below. Accordingly, an aspect of the present invention is to provide an apparatus and method that constitute an adaptive Hybrid Automatic Repeat reQuest (HARQ) interlace considering a transmission interval length of a data burst in a wireless mobile communication system.

Another aspect of the present invention is to provide an apparatus and method that constitute an adaptive HARQ interlace considering a signal transmission/reception processing time in a wireless mobile communication system.

In accordance with an aspect of the present invention, a method for controlling an HARQ operation in a transmitter of a wireless mobile communication system using each frame constituted by a plurality of subframes is provided. The method includes transmitting indication information indicating a subframe position where transmission of a data burst starts and the number of subframes required for transmission of the data burst to a receiver through an i-th frame, determining to retransmit the data burst at the subframe position indicated by indication information of an (i+1)-th frame to the receiver when the number of subframes does not exceed a threshold, and determining to retransmit the data burst at the subframe position indicated by indication information of an (i+n)-th frame to the receiver, where n is a positive integer exceeding 1, when the number of subframes exceeds the threshold.

In accordance with another aspect of the present invention, a method for controlling an HARQ operation in a receiver of a wireless mobile communication system using each frame constituted by a plurality of subframes is provided. The method includes receiving indication information indicating a subframe position where transmission of a data burst starts and the number of subframes required for transmission of the data burst from a transmitter through an i-th frame, determining to receive the data burst retransmitted at the subframe position indicated by indication information of an (i+1)-th frame from the transmitter when the number of subframes does not exceed a threshold, and determining to receive the data burst retransmitted at the subframe position indicated by indication information of an (i+n)-th frame from the transmitter, where n is a positive integer exceeding 1, when the number of subframes exceeds the threshold.

In accordance with yet another aspect of the present invention, a transmitter for controlling an HARQ operation in a wireless mobile communication system using each frame constituted by a plurality of subframes is provided. The transmitter includes a data burst transmission information generator for generating indication information indicating a subframe position where transmission of a data burst starts and the number of subframes required for transmission of the data burst and for transmitting the indication information to a receiver through an i-th frame, and a controller for determining to retransmit the data burst at the subframe position indicated by indication information of an (i+1)-th frame to the receiver when the number of subframes does not exceed a threshold, and for determining to retransmit the data burst at the subframe position indicated by indication information of an (i+n)-th frame to the receiver, where n is a positive integer exceeding 1, when the number of subframes exceeds the threshold.

In accordance with still another aspect of the present invention, a receiver for controlling an HARQ operation in a wireless mobile communication system using each frame constituted by a plurality of subframes is provided. The receiver includes a data burst transmission information reader for reading indication information indicating a subframe position where transmission of a data burst starts and the number of subframes required for transmission of the data burst from a transmitter through an i-th frame and for outputting a read result, a comparator for comparing the number of subframes with a threshold and for outputting a comparison result, and a controller for determining to receive the data burst retransmitted at the subframe position indicated by indication information of an (i+1)-th frame from the transmitter when the number of subframes does not exceed the threshold, and for determining to receive the data burst retransmitted at the subframe position indicated by indication information of an (i+n)-th frame from the transmitter, where n is a positive integer exceeding 1, when the number of subframes exceeds the threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a signal transmission/reception apparatus and method for adaptively controlling a transmission/reception timing relation of signals to be transmitted and received according to a Hybrid Automatic Repeat reQuest (HARQ) scheme by considering signal processing capabilities in a wireless mobile communication system. An exemplary embodiment of the present invention is applicable to a wireless mobile communication system using a frame structure to which a Frequency Division Duplex (FDD) scheme, a Time Division Duplex (TDD) scheme, a Half-duplex FDD (HFDD) scheme, or both the FDD and TDD schemes has been applied. A frame structure used in a wireless mobile communication system to which the TDD or HFDD scheme has been applied can variously use a resource occupancy ratio between a DownLink (DL) subframe and an UpLink (UL) subframe.

Hereinafter, in an exemplary embodiment of the present invention, a Base Station (BS) and a Mobile Station (MS) transmit and receive a signal according to the HARQ scheme on the basis of a super frame structure. A super frame includes at least one frame. Each frame includes at least one subframe. The subframe includes at least one Orthogonal Frequency Division Multiple Access (OFDMA) symbol.

Figure 1A:
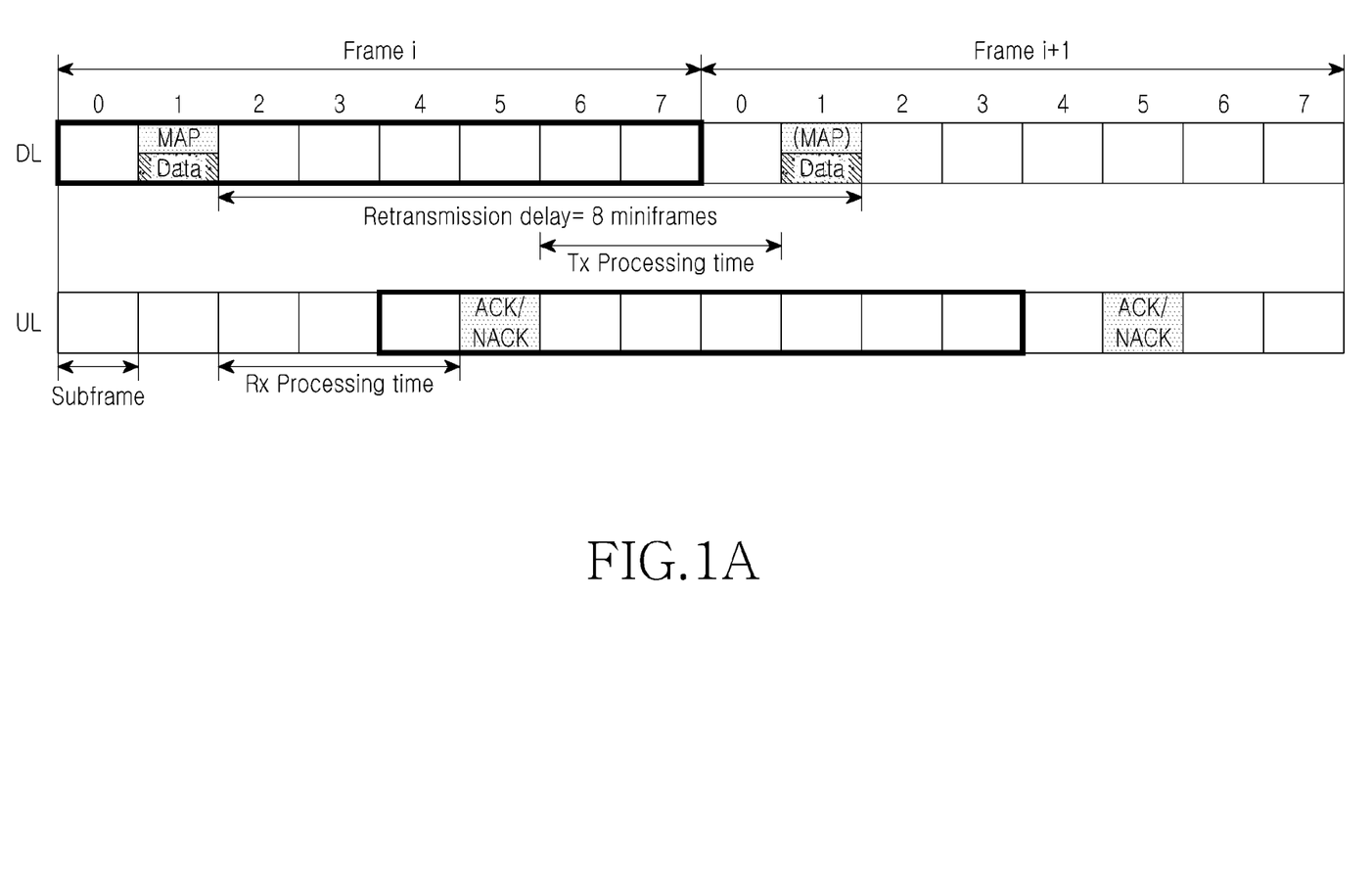
FIGS. 1A and 1B illustrate a Hybrid Automatic Repeat reQuest (HARQ) interlace structure used in a wireless mobile communication system according to an exemplary embodiment of the present invention.
Figure 1B:
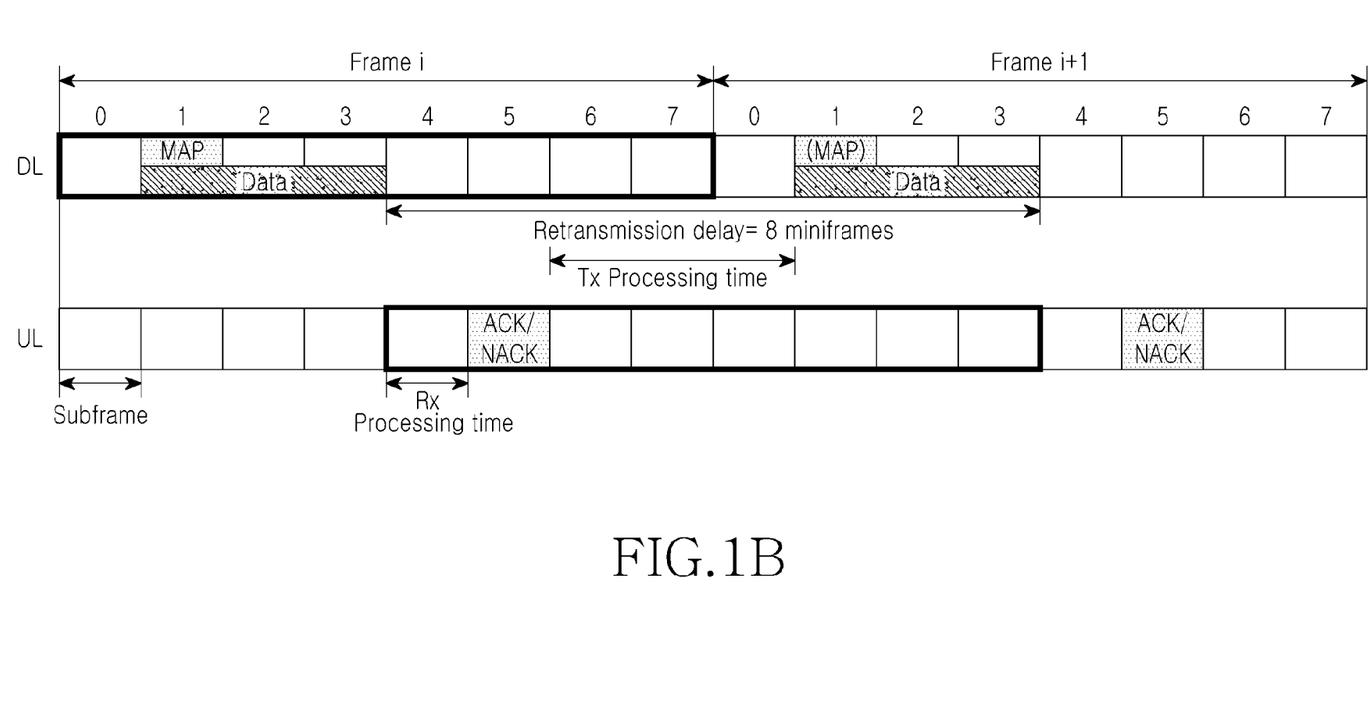

FIGS. 1A and 1B illustrate an example of an HARQ interlace structure used in a wireless mobile communication system according to an exemplary embodiment of the present invention.

Referring to FIG. 1A, after the BS transmits a MAP and/or a data burst in a No. 1 subframe of an i-th frame (that is, Frame i) to the MS, an 8-subframe interval is required until a MAP and/or a data burst are transmitted or retransmitted in a No. 1 subframe of an (i+1)-th frame (Frame i+1). In other words, a synchronous HARQ having a regular retransmission delay of 8 subframes is illustrated in FIG. 1A.

The MAP includes information indicating resources allocated for data burst transmission. Here, when the data burst is retransmitted at the same resource position using the same transmission scheme as in the previous transmission, the system overhead can be reduced by reducing an amount of MAP information related to the data burst to be retransmitted. When the resource position or the transmission scheme has changed according to a channel state, a MAP including information indicating resource allocation information, a transmission type, etc. can be provided. Here, the transmission type includes channel coding, a Modulation and Coding Scheme (MCS), Multiple-Input Multiple-Output (MIMO), a pilot pattern, etc.

The MS receives a MAP and a data burst transmitted in a No. 1 subframe of Frame i from the BS, and requires a 3-subframe interval until an ACKnowledge (ACK) or Not ACKnowledge (NACK) for the received data burst is transmitted to the BS. That is, a reception (Rx) processing time corresponds to the 3-subframe interval.

In contrast, while 8 subframes per frame are illustrated in FIGS. 1A and 1B, 4 subframes per frame may be constituted. When one frame includes 4 subframes, a signal transmission/reception process can be performed during at least one frame.

The BS requires a transmission (Tx) processing time corresponding to a 3-subframe interval to prepare retransmission after detecting NACK from the MS. After the Tx processing time, the BS transmits or retransmits a MAP and a data burst in a No. 1 subframe of Frame i+1. In FIGS. 1A and 1B, "(MAP)" indicates that MAP transmission may be omitted when a data burst transmission scheme and a resource position are the same as those at an initial transmission time.

FIG. 1A illustrates an HARQ operation having a retransmission delay of an 8-subframe interval, that is, a 1-frame length, as an example in which a data burst is transmitted during one subframe. The HARQ interlace structure of FIG. 1A requires an 8-subframe interval until one data burst undergoes transmission and reception processing of a transmitter and a receiver and is retransmitted. The HARQ operation having the retransmission delay of the 1-frame length as described above is called a fast HARQ interlace. Data bursts, to be transmitted and received in the HARQ operation, have a regular correspondence relation so as to support the retransmission delay. There is an advantage in that the regular correspondence relation can reduce an amount of information indicating resource allocation since a subframe position at which the ACK/NACK or data burst is retransmitted according to a position of a subframe indicating data burst transmission is defined.

In contrast, in FIG. 1B, one data burst is transmitted in a 3-subframe interval. In this case, the MS must perform reception processing (decoding and demodulation) for the received data burst during a 1-subframe interval after data burst reception so as to follow the fast HARQ interlace operation as described with reference to FIG. 1A. If the reception processing for the received data burst is not performed during the 1-subframe interval because the capability of the BS is not sufficient, an additional signal processing time is required. Accordingly, the ACK or NACK cannot be transmitted in a No. 5 subframe of Frame i.

To address this problem, the ACK/NACK can be transmitted in the No. 7 subframe of Frame i after a delay is made by the time required to perform the reception processing for the received data burst, in this example 3 subframes. However, since a transmission processing time is reduced due to a delayed ACK/NACK position, it is difficult to retransmit a MAP and a data burst in a No. 1 subframe of Frame i+1 according to the predefined retransmission delay. Also, a subframe position at which the MAP and the data burst are retransmitted can change.

Since a position of a subframe to be retransmitted or the ACK/NACK to be delayed as described above does not follow the regular correspondence relation of the synchronous HARQ interlace, additional control information and scheduling are needed, thereby increasing complexity. Accordingly, the above-described synchronous HARQ needs an adaptive HARQ operation scheme for supporting transmission intervals of various sizes of data bursts and processing capabilities of the BS and MS.

Hereinafter, various HARQ interlace operation schemes including a slow HARQ interlace to adaptively support transmission intervals of various lengths of data bursts and processing capabilities of the BS and MS are proposed and their signal transmission/reception methods will be described.

Figure 2A:
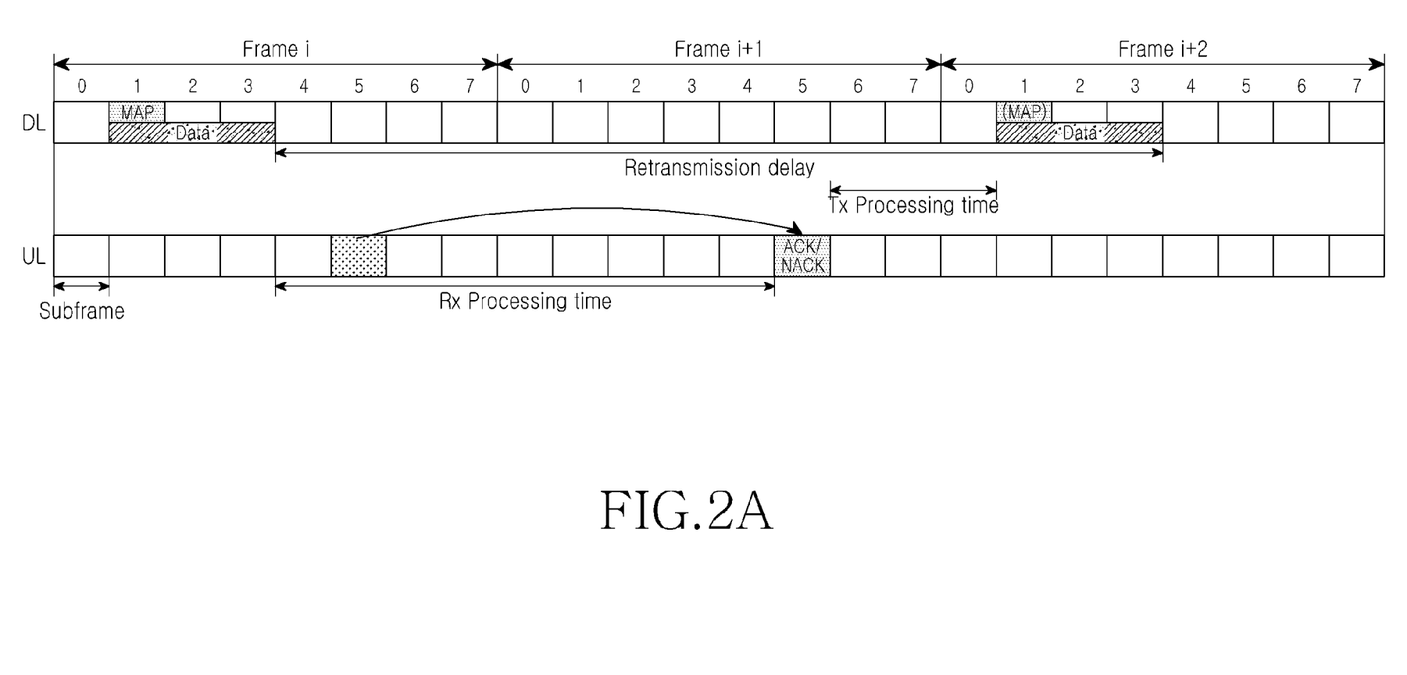
FIGS. 2A and 2B illustrate a slow HARQ interlace structure in a wireless mobile communication system according to an exemplary embodiment of the present invention.
Figure 2B:
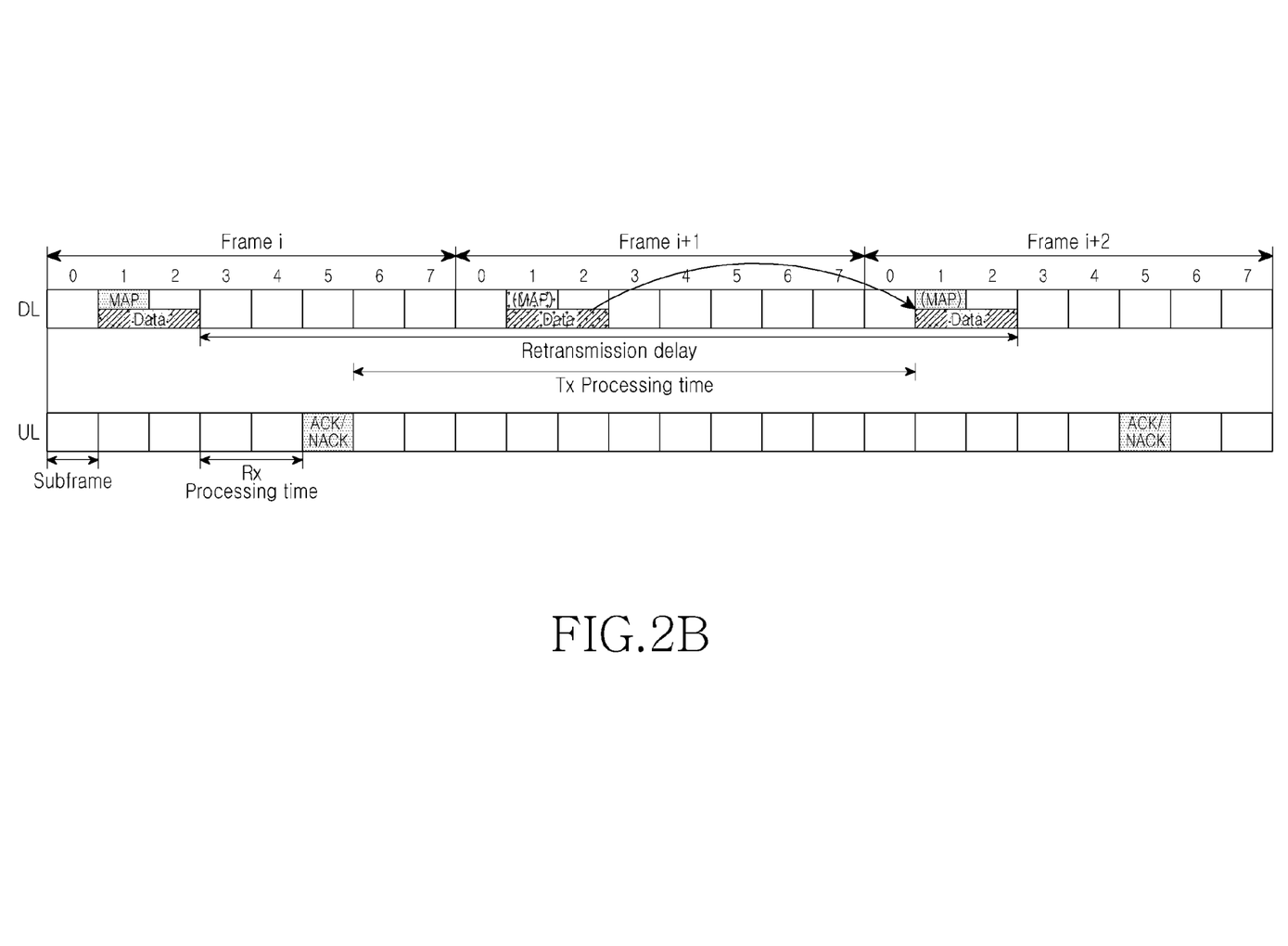

FIGS. 2A and 2B illustrate a slow HARQ interlace structure in a wireless mobile communication system according to an exemplary embodiment of the present invention.

Referring to FIG. 2A, a BS transmits a MAP and a data burst to an MS during an interval of subframes Nos. 1 to 3 of Frame i. In this case, the MAP, which includes information indicating resource allocation, is provided at a position where the data burst transmission starts. That is, when the data burst is transmitted in subframes Nos. 1 to 3, the MAP is provided in the No. 1 subframe.

The MS receives the MAP and the data burst transmitted in the subframes Nos. 1 to 3 of Frame i from the BS. However, since the MS cannot support reception processing for the data burst having the 3-subframe transmission interval during one subframe, an additional reception processing time is needed.

An exemplary embodiment of the present invention proposes a slow HARQ interlace in which additional indication information is not needed at a retransmission time while providing a sufficient reception processing time considering a data burst transmission interval. The slow HARQ interlace structure has the same subframe position for the next HARQ operation at every frame as the fast HARQ interlace structure. In this regard, a subframe position for an operation requiring an additional processing time is delayed by an n-frame interval (where n is a positive integer exceeding 1). Here, the HARQ operation includes a resource allocation indication, data burst transmission, ACK/NACK transmission, data burst retransmission, etc.

Referring to FIG. 2A, the MS receives a MAP and a data burst in subframes Nos. 1 to 3 of Frame i, requires a greater reception processing time than a 1-frame interval, and transmits ACK/NACK in the No. 5 subframe of Frame i+1 instead of the No. 5 subframe of Frame i. The BS detects the ACK/NACK and retransmits the data burst in subframes Nos. 1 to 3 of Frame i+2 when a 3-subframe interval as a transmission processing time required to perform retransmission is sufficient, where n is 2. FIG. 2A illustrates an exemplary implementation in which an MS delays ACK/NACK transmission to secure a reception processing time of at least a given standard.

Similarly, FIG. 2B illustrates an exemplary implementation in which a MAP and a data burst are transmitted or retransmitted in subframes Nos. 1 to 2 of Frame i+2 without transmitting or retransmitting the MAP and the data burst in subframes Nos. 1 to 2 of Frame i+1 with respect to a data burst transmitted in subframes Nos. 1 to 2 of Frame i to secure the transmission processing time when the MS needs an additional transmission processing time for encoding, scheduling, etc. to be performed for retransmission (where n is 2). Here, the MAP transmission may be omitted according to a service state.

FIGS. 2A and 2B are examples of methods for securing the reception processing time and the transmission processing time. When both of the two methods are considered and a data burst is transmitted in Frame i, ACK/NACK can be transmitted in Frame i+1 and the data burst can be retransmitted in Frame i+2.

FIGS. 2A and 2B are examples as applied to an FDD system. However, this is merely for convenience and the above-described concept can be equally applied to the TDD or HFDD system. Each system has a regular HARQ correspondence relation so that a retransmission delay of a 1-frame interval is supported to provide fast retransmission. However, when it is difficult to support the retransmission delay of the 1-frame interval according to a data burst transmission interval or signal processing capability of the system, a position of ACK or NACK transmission or data burst retransmission is delayed by an interval of at least one frame on the basis of the same correspondence relation (that is, the same subframe position within each frame).

That is, in an exemplary embodiment of the present invention, the HARQ operation on each data burst is controlled so that a retransmission delay of the slow HARQ interlace is an integer multiple of a retransmission delay of the fast HARQ interlace for a data burst to be transmitted in a subframe. Since the HARQ operation has a retransmission delay of an integer multiple, a position of the same resource can be used within each frame and therefore the transmission of MAP information indicating resource allocation at a retransmission time can be omitted.

As described above, the system can perform HARQ operations having different retransmission delays on the basis of a transmission interval length of a data burst according to system processing capability.

In an exemplary embodiment of the present invention, an adaptive HARQ interlace operation method for supporting various retransmission delays according to system processing capability and a burst transmission size and interval is proposed.

In an exemplary embodiment of the present invention, a BS determines an HARQ interlace type by adaptively controlling a retransmission delay according to a data burst transmission interval or processing capability of an MS through pre-negotiation between the MS and the BS (before data burst transmission). Here, the retransmission delay can be defined according to system processing capability, a service request state, etc.

Figure 3:
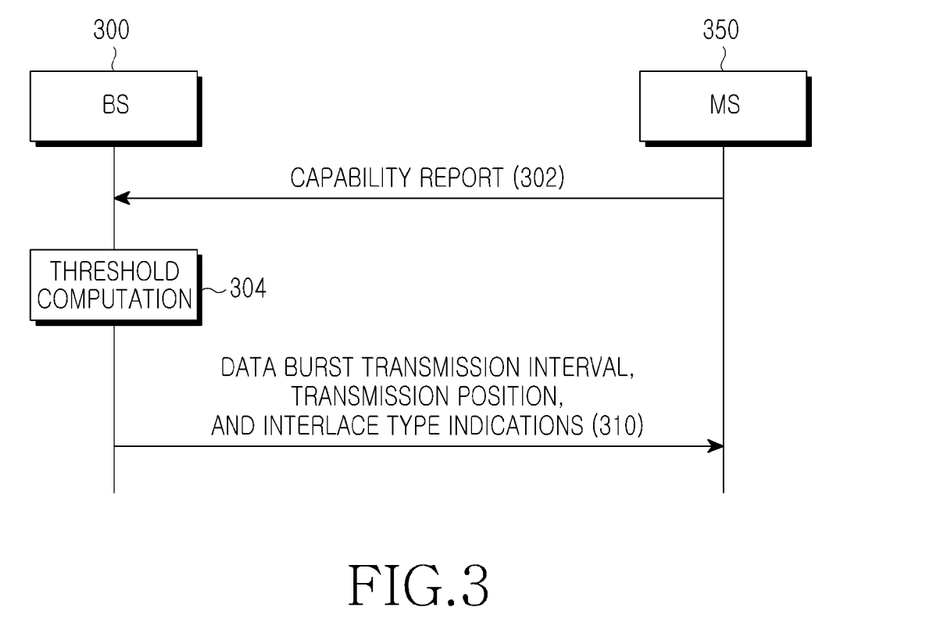
FIG. 3 is a signal flow diagram illustrating signal transmission/reception for an HARQ interlace method according to an exemplary embodiment of the present invention.

FIG. 3 is a signal flow diagram illustrating signal transmission/reception for an HARQ interlace method according to an exemplary embodiment of the present invention.

Referring to FIG. 3, an MS 350 reports its capability to a BS 300 in step 302. The capability may be determined by at least one of a channel coding scheme, a Multiple-Input Multiple-Output (MIMO) scheme, and an HARQ scheme capable of being supported by the MS 350, and, for example, may indicate a reception processing time. Here, for example, the channel coding scheme can be at least one of Convolutional Coding (CC), Convolutional Turbo Coding (CTC), Low Density Parity Check (LDPC) coding, Block Truncation Coding (BTC) and the like. The MIMO scheme can be at least one of non-MIMO, Spatial Multiplexing (SM), pre-coding and the like and the HARQ scheme can be at least one of Incremental Redundancy (IR), Chase Combining (CC) and the like.

In step 304, the BS 300 determines a threshold for a retransmission delay by considering its own capability and/or the capability of the MS 350 reported in step 302. For example, the capability of the BS may indicate a transmission processing time. Thereafter, at the time of transmitting data to, or receiving data from, the MS 350, a data burst transmission interval length, a transmission position, and an HARQ interlace type determined using the determined threshold are indicated in step 310. The data burst transmission interval length is expressed by the number of subframes, the HARQ interlace type can be variously determined according to a retransmission delay, and the retransmission delay is an integer multiple of a 1-frame length. The HARQ interlace type is determined by the retransmission delay on the basis of the HARQ, and a subframe position within each frame on which the HARQ operation is performed is constant.

Figure 4:
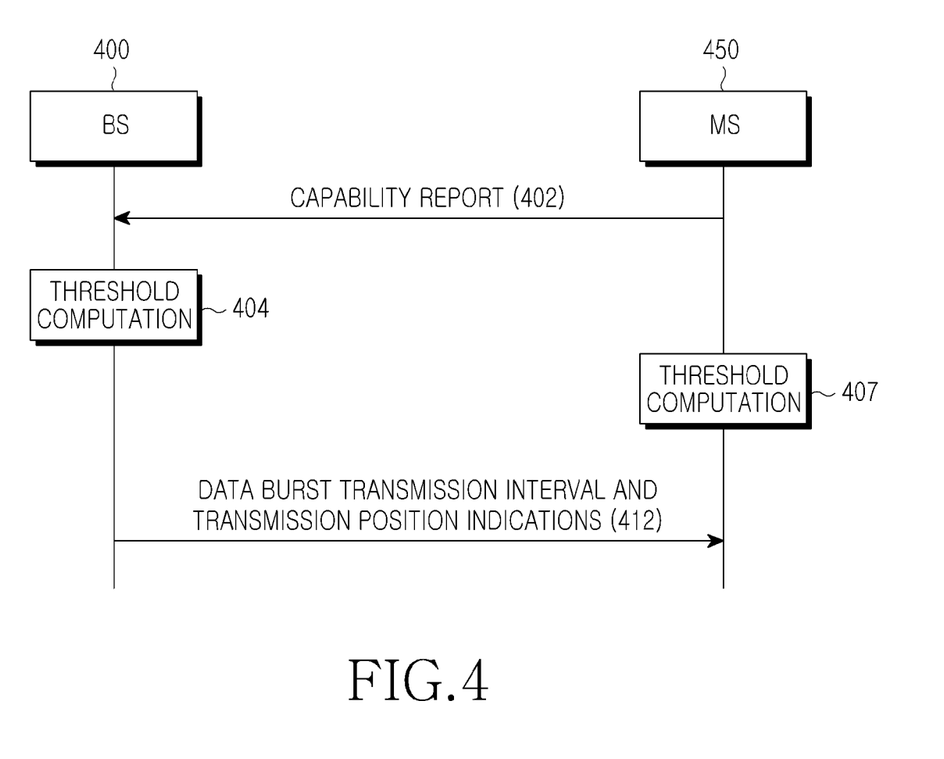
FIG. 4 is a signal flow diagram illustrating signal transmission/reception determining a retransmission delay according to an exemplary embodiment of the present invention.

FIG. 4 is a signal flow diagram illustrating signal transmission/reception determining a retransmission delay according to an exemplary embodiment of the present invention.

Referring to FIG. 4, an MS 450 and a BS 400 exchange capability information in step 402. In steps 404 and 407, each of the BS 400 and the MS 450 respectively determines a threshold for a retransmission delay by considering its own capability and the capability reported from a counterpart. Here, the BS 400 and the MS 450 may determine the same threshold using the same algorithm.

When transmitting data to, or receiving data from, the MS 450, the BS 400 determines a data burst transmission interval length, a transmission position, and an HARQ interlace type for supporting the retransmission delay using the determined threshold. When the next data burst transmission/reception is indicated, the BS 400 sends indications of the data burst transmission interval length and the transmission position to the MS 450 in step 412. At this time, the BS 400 does not specially indicate the HARQ interlace type. This is because the BS 400 and the MS 450 determine the same threshold and know the retransmission delay that each other is capable of supporting according to a data burst transmission interval length. That is, the HARQ interlace type is determined using the same algorithm through the retransmission delay. Since the BS 400 does not indicate the HARQ interlace type for supporting the retransmission delay, signaling overhead can be reduced.

As illustrated in FIGS. 3 and 4, the BS or MS determines a threshold for supporting a retransmission delay based on each other's capability and determines an HARQ interlace type according to a data burst transmission interval length. For example, the HARQ interlace type can be determined based on inferior capability of the capabilities of the BS and/or MS by considering signal transmission/reception.

Figure 5:
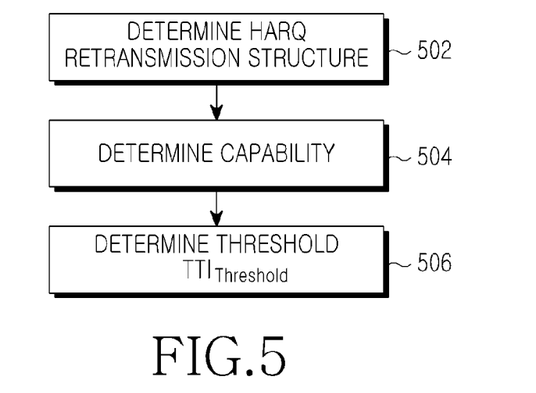
FIG. 5 is a flowchart illustrating a threshold computation process capable of supporting a specific retransmission delay in a synchronous HARQ according to an exemplary embodiment of the present invention.

FIG. 5 is a flowchart illustrating a threshold computation process for supporting a retransmission delay in an HARQ according to an exemplary embodiment of the present invention.

Both a BS and an MS are possible as an operation subject of FIG. 5. An operation of the BS will be described merely for convenience of description and not by way of limitation.

Referring to FIG. 5, in step 502 the BS determines the HARQ retransmission structure and determines to perform a synchronous HARQ operation based on a retransmission delay capable of being supported in the system. The BS determines the capability of the MS in step 504 and then proceeds to step 506. At this time, the BS can determine its own capability as well as the capability of the MS. In step 506, the BS determines a retransmission delay according to each transmission interval length by considering the determined capabilities of the BS and MS as well as other factors. That is, a transmission interval length threshold ($TTI_{threshold}$) of a data burst to be used for the retransmission delay determination is determined. Here, a minimum retransmission delay capable of being supported by the system can be considered as an example of the retransmission delay.

In an exemplary embodiment of the present invention, the threshold is determined according to the synchronous HARQ operation based on the retransmission delay capable of being supported by the system. Time positions for Transmission-Feedback-Retransmission are predefined so that a regular retransmission delay is provided in the synchronous HARQ operation. Thus, a threshold for supporting the retransmission delay can be determined on the basis of the predefined positions.

In an exemplary embodiment of the present invention, there is proposed a method for determining a threshold of a transmission interval length capable of supporting the retransmission delay according to each subframe position on the basis of processing capabilities of transmitter and receiver.

At a subframe position where data burst transmission starts for the HARQ operation, an interval to a subframe position where ACK/NACK is transmitted must be determined by considering at least one of a transmission interval length, reception processing capability of the MS, and transmission processing capability of the BS. In the synchronous HARQ operation for supporting the retransmission delay, the transmission interval capable of supporting the HARQ operation can be determined when considering the transmission or reception processing capability of the MS or BS. The data burst transmission interval is an interval excluding a reception processing time from a time taken from a data burst transmission start time position to a position before the ACK/NACK is transmitted. Similarly, when the transmission processing capability of the BS is considered in the HARQ operation for supporting the retransmission delay, the next transmission interval is an interval excluding a transmission processing time from a time taken from a position after the ACK/NACK transmission to a position before retransmission starts.

For example, for DL transmission in the FDD system in which each frame includes 8 subframes, data burst transmission starts in the subframe No. 0 of Frame i. The MS transmits ACK or NACK in the subframe No. 5 of Frame i. When the reception processing time is 2, the threshold is determined as 4−2=2. Here, a threshold unit is one subframe. When the BS transmits a data burst during a 2-subframe interval, a fast HARQ interlace operates since the data burst transmission interval length is less than the threshold. When the BS transmits a data burst during a 4-subframe interval, a slow HARQ interlace operates since the data burst transmission interval length exceeds the threshold.

The threshold determination operation will be described in more detail with reference to Table 1.

TABLE 1

|  | DL | | UL | |
| --- | --- | --- | --- | --- |
|  | $L_{max}$ | $TTI_{threshold}$ | $L_{max}$ | $TTI_{threshold}$ |
| FDD | F | $Ceil(F/2) - T_{RX}$ | F | $Floor(F/2) - T_{RX}$ |
| TDD M:N | M − m | $M - m + n_m - T_{RX}$ | N − n | $N - n + m_n - T_{RX}$ |
| HFDD M:N DU | M − m | $M - m + (n_m - M) - T_{RX} = -m + n_m - T_{RX}$ | N − n | $N - (n - M) + m_n - T_{RX}$ |
| UD | N − m | $N - (m - M) + n_m - T_{RX}$ | M − n | $M - n + (m_n - N) - T_{RX}$ |

Table 1 is based on the synchronous HARQ structure having a retransmission delay of a 1-frame interval in the FDD, TDD, and HFDD systems.

In Table 1, F denotes the number of subframes constituting each frame. In a TDD communication system and an HFDD Downlink and Uplink (DU) communication system, M denotes the number of subframes constituting a DL frame and N denotes the number of subframes constituting a UL frame. DU denotes a frame structure in which a UL frame is arranged after a DL frame in time in the HFDD communication system. In contrast, in an HFDD Uplink and Downlink (UD) communication system, M denotes the number of subframes constituting a UL frame and N denotes the number of subframes constituting a DL frame. UD denotes a frame structure in which a DL frame is arranged after a UL frame in time in the HFDD communication system. Here, the frame structure can be designed by considering M+N=F so as to maximize the commonality of each system.

In Table 1, m denotes a subframe index in which DL data burst transmission starts and n denotes a subframe index in which UL data burst transmission starts. Here, m=0, - - -, K-1 and n=0, - - -, K-1, where K=F, M, or N according to a system. $n_m$ denotes a UL subframe index n in which ACK/NACK for data burst transmission started in a No. m subframe is transmitted. $m_n$ denotes a DL subframe index m in which ACK/NACK for data burst transmission started in a No. n subframe is transmitted.

$T_{RX}$ denotes the number of subframes required for reception processing, $L_{max}$ denotes a maximum transmission interval length capable of being provided in each frame, and $TTI_{threshold}$ denotes a threshold of a transmission interval length capable of supporting a retransmission delay.

Tables 2 to 5 show thresholds determined in various communication systems using Table 1. Here, it is assumed that the retransmission delay is an 8-subframe interval and the reception processing time TRX of the system is a 2-subframe interval.

TABLE 2

FDD/HFDD 4:4 (m: 0~3 in DU, m: 4~7 in UD)

| DL | | | UL | | |
|---|---|---|---|---|---|
| M | $n_m$ | Threshold | $m_n$ | n | Threshold |
| 0 | 4 | 2 | 0 | 4 | 2 |
| 1 | 5 | 2 | 1 | 5 | 2 |
| 2 | 6 | 2 | 2 | 6 | 2 |
| 3 | 7 | 2 | 3 | 7 | 2 |
| 4 | 0 | 2 | 4 | 0 | 2 |
| 5 | 1 | 2 | 5 | 1 | 2 |
| 6 | 2 | 2 | 6 | 2 | 2 |
| 7 | 3 | 2 | 7 | 3 | 2 |

TABLE 3

TDD 4:4

| DL | | | UL | | |
|---|---|---|---|---|---|
| M | $n_m$ | Threshold | $m_n$ | n | Threshold |
| 0 | 0 | 2 | 0 | 0 | 2 |
| 1 | 1 | 2 | 1 | 1 | 2 |
| 2 | 2 | 2 | 2 | 2 | 2 |
| 3 | 3 | 2 | 3 | 3 | 2 |

TABLE 4

TDD 5:3

| DL | | | UL | | |
|---|---|---|---|---|---|
| M | $n_m$ | Threshold | $m_n$ | n | Threshold |
| 0 | 0 | 3 | 0 | 0 | 1 |
| 1 | 0 | 2 | 1 | 0 | 2 |
| 2 | 1 | 2 | 2 | 1 | 2 |
| 3 | 1 | 1 | 3 | 1 | 2 |
| 4 | 2 | 1 | 4 | 2 | 1 |

TABLE 5

TDD 6:2

| DL | | | UL | | |
|---|---|---|---|---|---|
| M | $n_m$ | Threshold | $m_n$ | n | Threshold |
| 0 | 0 | 4 | 0 | 0 | 0 |
| 1 | 0 | 3 | 1 | 0 | 1 |
| 2 | 0 | 2 | 2 | 0 | 2 |
| 3 | 1 | 2 | 3 | 1 | 1 |
| 4 | 1 | 1 | 4 | 1 | 1 |
| 5 | 1 | 0 | 5 | 1 | 1 |

As shown in Tables 1 to 5, it can be seen that a supportable threshold can differ according to a system characteristic.

Hereinafter, a method in which a system for supporting a synchronous HARQ determines a data burst transmission position according to a service request state and a channel state will be described.

Figure 6:
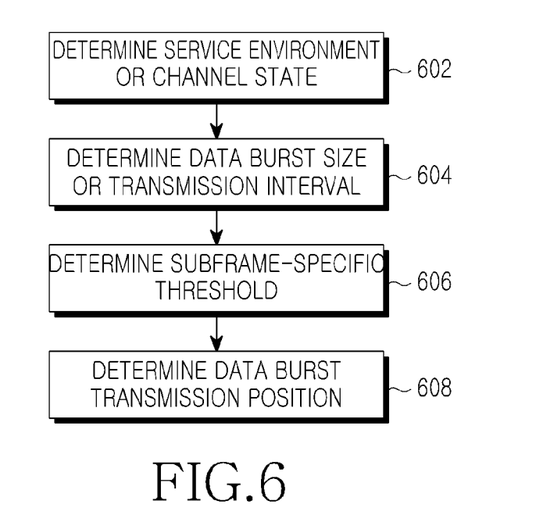
FIG. 6 is a flowchart illustrating a process for determining data burst transmission positions of a base station and a mobile station according to an exemplary embodiment of the present invention.

FIG. 6 is a flowchart illustrating a process for determining data burst transmission positions of a BS and an MS according to an exemplary embodiment of the present invention.

Hereinafter, for convenience of description, an example in which the BS determines a data burst transmission position will be described. In another exemplary embodiment, the following operation can be performed by the MS.

Referring to FIG. 6, in step 602 the BS determines a service environment and/or a channel state. In step 604, the BS defines a data burst size or a data burst transmission interval length according to the determined service environment and/or channel state. For example, when a UL channel state is bad, UL performance can be improved by transmitting one data burst in a plurality of intervals. In step 606, a threshold capable of supporting the data burst size or transmission interval length is determined. More specifically, in step 606 the BS determines the threshold capable of supporting data burst transmission. In step 608, the BS determines a subframe position for data burst transmission using the determined threshold.

An exemplary embodiment of the present invention proposes a method for determining a transmission interval to support various HARQ operations according to a service characteristic. When a data burst to be transmitted at a specific subframe position needs a fast retransmission delay, a transmission interval length can be adjusted to support the retransmission delay.

Figure 7:
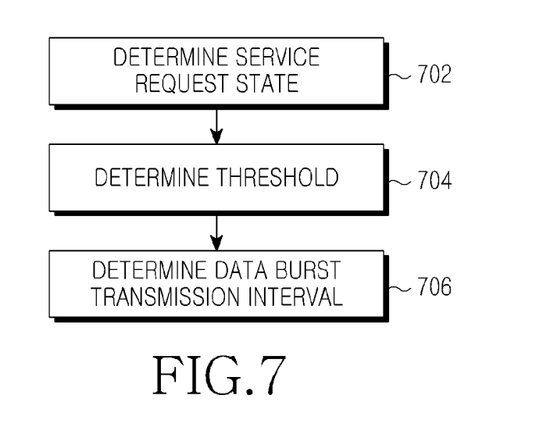
FIG. 7 is a flowchart illustrating a process for determining data burst transmission intervals of a base station and a mobile station according to an exemplary embodiment of the present invention.

FIG. 7 is a flowchart illustrating a process for determining data burst transmission intervals of a BS and an MS according to an exemplary embodiment of the present invention.

Hereinafter, for convenience of description, an example in which the BS determines a data burst transmission interval will be described. In another exemplary embodiment, the following operation can be performed by the MS.

Referring to FIG. 7, in step 702 the BS determines a service request state in the MS or system. That is, the BS determines whether the MS or system requests a fast or slow HARQ interlace according to the service request state. The BS determines a threshold for a data burst transmission interval length in step 704. In step 706, the BS determines a transmission interval capable of supporting the fast HARQ interlace using the determined threshold.

When a service requesting a high transmission rate is considered, the BS determines the threshold and determines a data burst transmission interval, which is not greater than the threshold, so that the high transmission rate can be supported.

In an exemplary embodiment of the present invention, there is proposed a method for operating an HARQ interlace by adaptively determining a retransmission delay according to the above-described data burst transmission interval. The BS provides the MS with indication information for data burst transmission determined through the above-described process. Here, the indication information includes at least one of a transmission position, a data burst size, a data burst transmission interval length, and an HARQ interlace type.

There are two schemes in which the MS may apply the HARQ interlace type.

In the first scheme, as illustrated in FIG. 4, the MS determines a threshold based on the same information as that of the BS and determines an HARQ interlace type from a transmission interval length indicated by the BS.

The MS is notified of the capability of the BS and determines a threshold capable of supporting various retransmission delays according to the capabilities of the MS and BS. That is, the MS can determine a threshold for an adaptive HARQ interlace operation through pre-negotiation with the BS. Accordingly, the MS can know the HARQ interlace type through a data burst transmission interval length without receiving information about the HARQ interlace type from the BS. That is, the MS determines a threshold capable of operating the adaptive HARQ interlace before data burst transmission.

Figure 8:
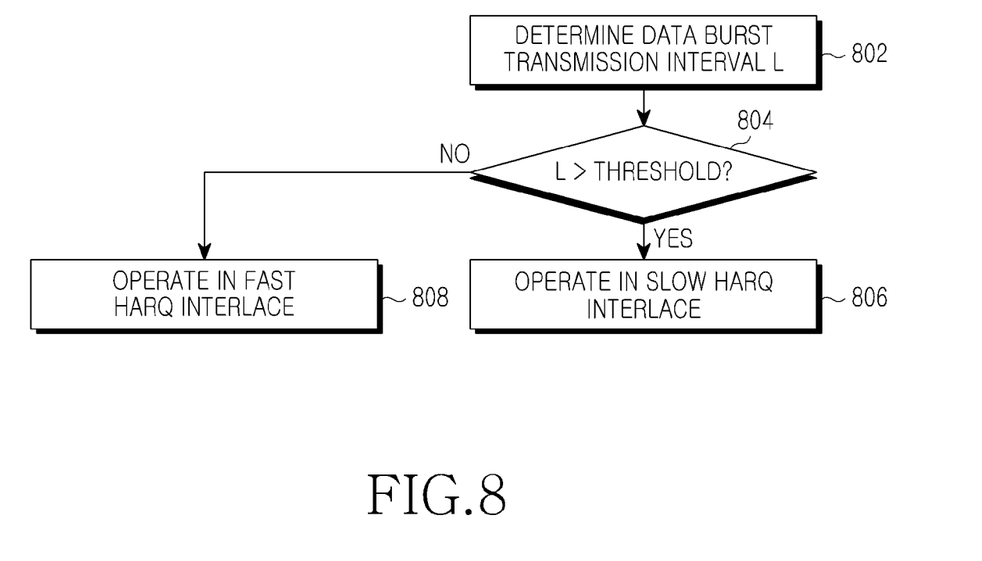
FIG. 8 is a flowchart illustrating a process in which a mobile station determines an interlace structure according to an exemplary embodiment of the present invention.

FIG. 8 is a flowchart illustrating a process in which an MS determines an HARQ interlace type according to an exemplary embodiment of the present invention.

Referring to FIG. 8, the MS determines a transmission interval length L from data burst transmission indication information received from the BS in step 802. In step 804, the MS determines whether the determined transmission interval length L exceeds a threshold. When it is determined that the transmission interval length L exceeds the threshold, the MS proceeds to step 806 to operate in the slow HARQ interlace. In contrast, when the transmission interval length L does not exceed the threshold, the MS proceeds to step 808 to operate in the fast HARQ interlace.

An example in which the MS operates in the fast or slow HARQ interlace according to the result of comparing the transmission interval length L with the threshold has been described with reference to FIG. 8. In another exemplary embodiment, an MS can compare the transmission interval length L with at least one predefined value and operate in the fast or slow HARQ interlace according to whether the transmission interval length L matches the at least one predefined value.

In contrast, in the second scheme in which the MS applies the HARQ interlace type as illustrated in FIG. 3, an MS determines the HARQ interlace type by receiving information indicating the HARQ interlace type to be applied to the data burst transmission from a BS. That is, when the BS indicates the data burst transmission, the BS notifies the MS of the HARQ interlace type to be used for the data burst transmission as a method for explicitly indicating the HARQ interlace type.

Figure 9:
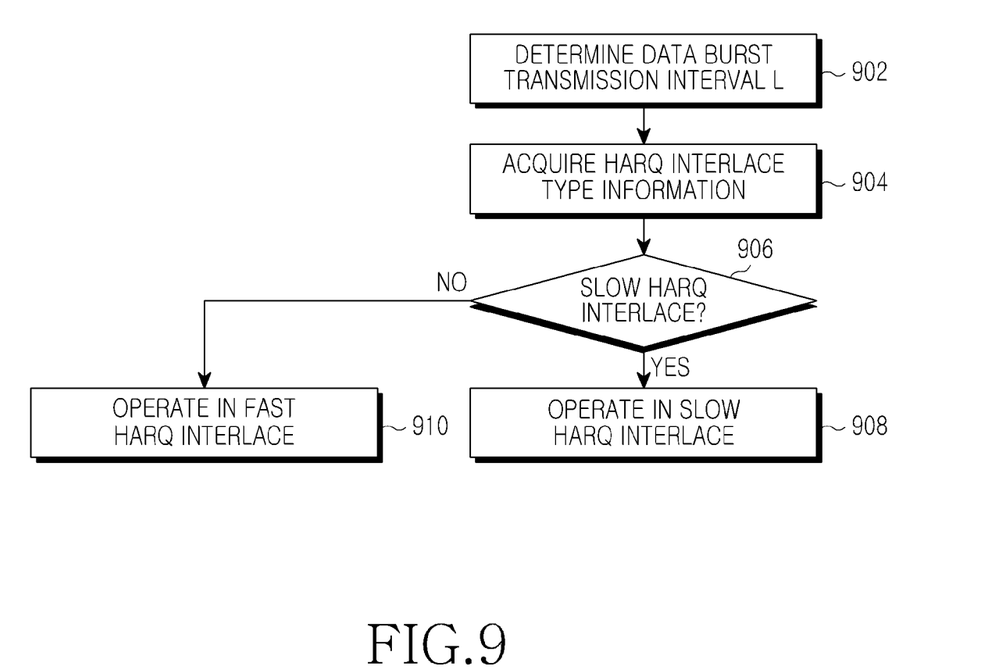
FIG. 9 is a flowchart illustrating a process in which a mobile station determines an interlace structure according to another exemplary embodiment of the present invention.

FIG. 9 is a flowchart illustrating a process in which an MS determines an HARQ interlace type according to another exemplary embodiment of the present invention.

Referring to FIG. 9, the MS determines a transmission interval length L from data burst transmission indication information received from the BS in step 902. The MS acquires HARQ interlace type information from the received indication information in step 904. In step 906, the MS determines whether the HARQ interlace type information indicates the slow interlace. When the HARQ interlace type information indicates the slow interlace as the determined result, the MS proceeds to step 908 to operate in the slow interlace. When the HARQ interlace type information indicates the fast interlace, the MS proceeds to step 910 to operate in the fast interlace.

Figure 10:
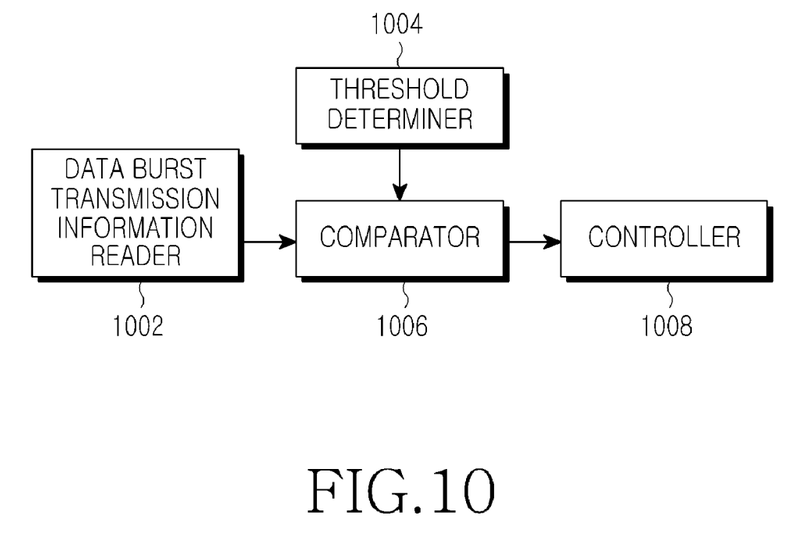
FIG. 10 is a block diagram illustrating a structure of an interlace structure determination device of a mobile station according to an exemplary embodiment of the present invention.

FIG. 10 is a block diagram illustrating a structure of an interlace type determination device of an MS according to an exemplary embodiment of the present invention.

Referring to FIG. 10, a data burst transmission indication information reader 1002 of the MS receives data burst transmission indication information from a BS, determines capabilities of the MS and BS, a data burst transmission position, a data burst transmission interval length, etc., and outputs the determined results to a comparator 1006. A threshold determiner 1004 determines a threshold by considering the capabilities of the BS and MS and outputs the determined threshold to the comparator 1006. The comparator 1006 compares the determined threshold with the data burst transmission interval length and outputs the comparison result to a controller 1008. The controller 1008 determines whether to operate in the fast or slow HARQ interlace according to the comparison result. Here, an example in which the data burst transmission indication information is received from the BS has been described, but the MS may receive the determined fast or slow HARQ interlace information from the BS. When the determined fast or slow HARQ interlace information is received from the BS, the MS operates in the fast or slow HARQ interlace according to the received information without performing the above-described operation of the controller 1008.

Figure 11:
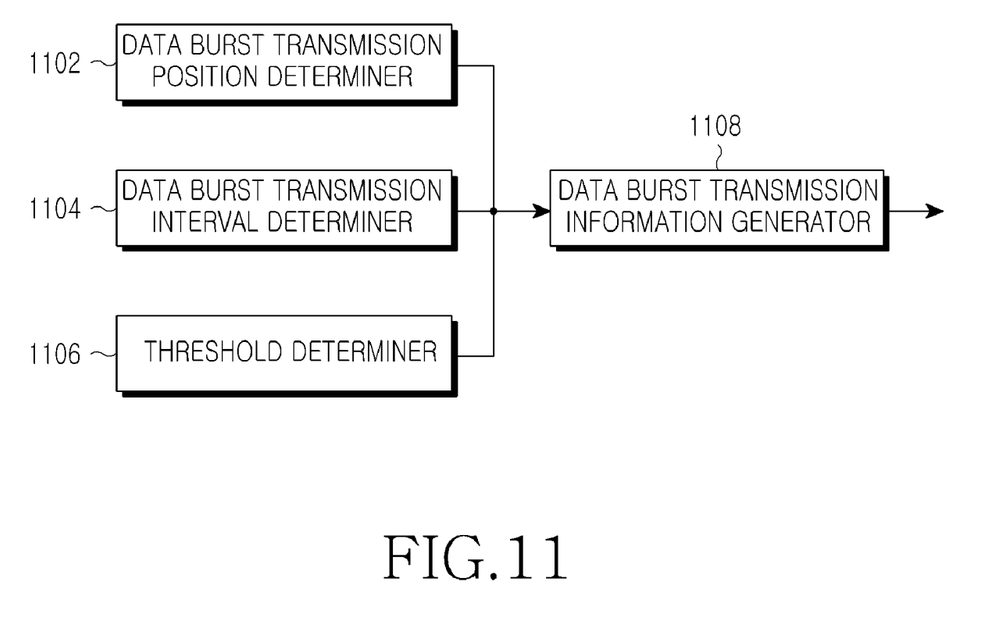
FIG. 11 is a block diagram illustrating a structure of a data burst transmission information generation device of a base station according to an exemplary embodiment of the present invention.

FIG. 11 is a block diagram illustrating a structure of a data burst transmission information generation device of a BS according to an exemplary embodiment of the present invention.

Referring to FIG. 11, a data burst transmission position determiner 1102 determines a data burst transmission position, that is, a subframe position, by considering a service environment, a channel state, a threshold, etc. Here, the threshold is determined by a threshold determiner 1106. A data burst transmission interval determiner 1104 determines a data burst transmission interval by identifying the threshold and an interlace type requested by an MS or system. A data burst transmission indication information generator 1108 generates data burst transmission indication information including at least one of the determined transmission position, the data burst transmission interval length, the threshold, and the interlace type and transmits the generated information to the MS. Then, a controller (not illustrated) compares the data burst transmission interval length with the threshold and determines whether to operate in the slow or fast HARQ interlace according to the comparison result. At this time the controller can transmit the determination result to the MS.

According to exemplary embodiments of the present invention, a signal can be transmitted and received flexibly and stably in a system environment having various types of data bursts or various capabilities by providing an adaptive HARQ interlace considering capabilities of a transmitter and a receiver when data is transmitted and received in a wireless mobile communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a Hybrid Automatic Repeat reQuest (HARQ) operation in a transmitter of a wireless mobile communication system using each frame constituted by a plurality of subframes, the method comprising:

transmitting indication information, indicating a subframe position where transmission of a data burst starts and the number of subframes required for transmission of the data burst, to a receiver through an i-th frame;

determining to retransmit the data burst at the subframe position indicated by indication information of an (i+1)-th frame to the receiver when the number of subframes does not exceed a threshold; and determining to retransmit the data burst at the subframe position indicated by indication information of an (i+n)-th frame to the receiver, where n is a positive integer exceeding 1, when the number of subframes exceeds the threshold.

2. The method of claim 1, further comprising:
transmitting a determination result to the receiver.

3. The method of claim 1, further comprising:
exchanging information about capabilities of the transmitter and receiver between the transmitter and receiver; and setting, by the transmitter, the threshold by considering the capabilities of the transmitter and receiver.

4. The method of claim 3, wherein the information about capabilities of the transmitter and receiver comprises at least one of channel coding, Multiple-Input Multiple-Output (MIMO), and HARQ schemes capable of being supported by the transmitter and receiver.

5. The method of claim 4, further comprising:
determining to retransmit the data burst at the subframe position indicated by the indication information of the (i+n)-th frame to the receiver when the number of subframes does not exceed the threshold and at least one of the capabilities of the transmitter and receiver does not support retransmission of the data burst at the subframe position indicated by the indication information of the (i+1)-th frame.

6. The method of claim 5, wherein the information about the capability of the transmitter comprises a transmission processing time taken to detect a feedback signal for a data burst transmitted in an i-th frame from the receiver and prepare retransmission of the data burst, and the information about the capability of the receiver comprises a reception processing time taken to receive a data burst transmitted in an i-th frame from the transmitter and transmit a feedback signal for the data burst.

7. The method of claim 1, wherein, according to at least one of a Frequency Division Duplex (FDD) scheme, a Time Division Duplex (TDD) scheme, and a Half-duplex FDD (HFDD) scheme to be used in the wireless mobile communication system, the threshold is determined by:

subframes constituting an UpLink (UL) frame in a TDD communication system and an HFDD Downlink and Uplink (DU) communication system, DU denotes a frame structure in which a UL frame is arranged after a DL frame in time in an HFDD communication system, M denotes the number of subframes constituting a UL frame and N denotes the number of subframes constituting a DL frame in an HFDD Uplink and Downlink (UD) communication system, UD denotes a frame structure in which a DL frame is arranged after a UL frame in time in the HFDD communication system, m denotes a DL subframe index in which data burst transmission starts, $m_n$ denotes a subframe index m in which at least one of ACK and NACK for data burst transmission started in a No. n subframe is transmitted, $n_m$ denotes a subframe index n in which at least one of ACK and NACK for data burst transmission started in a No. m subframe is transmitted, and $T_{RX}$ denotes the number of subframes required for a reception processing time.

8. A method for controlling a Hybrid Automatic Repeat reQuest (HARQ) operation in a receiver of a wireless mobile communication system using each frame constituted by a plurality of subframes, the method comprising:

receiving indication information, indicating a subframe position where transmission of a data burst starts and the number of subframes required for transmission of the data burst, from a transmitter through an i-th frame;

determining to receive the data burst retransmitted at the subframe position indicated by indication information of an (i+1)-th frame from the transmitter when the number of subframes does not exceed a threshold; and determining to receive the data burst retransmitted at the subframe position indicated by indication information of an (i+n)-th frame from the transmitter, where n is a positive integer exceeding 1, when the number of subframes exceeds the threshold.

9. The method of claim 8, further comprising:
receiving information of a frame in which the data burst is retransmitted from the transmitter; and determining to receive a data burst retransmitted at the subframe position indicated by indication information of a corresponding frame according to the received information.

10. The method of claim 8, further comprising:
exchanging information about capabilities of the transmitter and receiver between the transmitter and receiver; and setting, by the receiver, the threshold by considering the capabilities of the transmitter and receiver.

|  |  | DL | | UL | |
|---|---|---|---|---|---|
|  |  | $L_{max}$ | $TTI_{threshold}$ | $L_{max}$ | $TTI_{threshold}$ |
| FDD | | F | Ceil (F/2) − $T_{RX}$ | F | Floor(F/2) − $T_{RX}$ |
| TDD M:N | | M − m | M − m + $n_m$ − $T_{RX}$ | N − n | N − n + $m_n$ − $T_{RX}$ |
| HFDD | DU | M − m | M − m + ($n_m$ − M) − $T_{RX}$ = −m + $n_m$ − $T_{RX}$ | N − n | N − (n − M) + $m_n$ − $T_{RX}$ |
| M:N | UD | N − m | N − (m − M) + $n_m$ − $T_{RX}$ | M − n | M − n + ($m_n$ − N) − $T_{RX}$ | where F denotes the number of subframes constituting one frame, M denotes the number of subframes constituting a DownLink (DL) frame and N denotes the number of 11. The method of claim 10, wherein the information about the capabilities of the transmitter and receiver comprise at least one of channel coding, Multiple-Input Multiple-Output MIMO, and HARQ schemes capable of being supported by the transmitter and receiver.

12. The method of claim 11, further comprising:
   determining to receive the data burst retransmitted at the subframe position indicated by the indication information of the (i+n)-th frame from the transmitter when the number of subframes does not exceed the threshold and at least one of the capabilities of the transmitter and receiver does not support retransmission of the data burst at the subframe position indicated by the indication information of the (i+1)-th frame.

13. The method of claim 12, wherein the information about the capability of the transmitter comprises a transmission processing time taken to detect a feedback signal for a data burst transmitted in an i-th frame from the receiver and prepare retransmission of the data burst, and
   the information about the capability of the receiver comprises a reception processing time taken to receive a data burst transmitted in an i-th frame from the transmitter and transmit a feedback signal for the data burst.

14. The method of claim 8, wherein, according to at least one of a Frequency Division Duplex (FDD), a Time Division Duplex (TDD), and a Half-duplex FDD (HFDD) scheme to be used in the wireless mobile communication system, the threshold is determined by:

a data burst transmission information generator for generating indication information indicating a subframe position where transmission of a data burst starts and the number of subframes required for transmission of the data burst and for transmitting the indication information to a receiver through an i-th frame; and a controller for determining to retransmit the data burst at the subframe position indicated by indication information of an (i+1)-th frame to the receiver when the number of subframes does not exceed a threshold, and for determining to retransmit the data burst at the subframe position indicated by indication information of an (i+n)-th frame to the receiver, where n is a positive integer exceeding 1, when the number of subframes exceeds the threshold.

16. The transmitter of claim 15, wherein the controller transmits a determination result to the receiver.

17. The transmitter of claim 15, wherein the data burst transmission information generator exchanges information about capabilities of the transmitter and receiver between the transmitter and receiver, and the transmitter sets the threshold by considering the capabilities of the transmitter and receiver.

18. The transmitter of claim 17, wherein the information about the capabilities of the transmitter and receiver comprise at least one of channel coding, Multiple-Input Multiple-Out-

|  |  | DL |  | UL |  |
| --- | --- | --- | --- | --- | --- |
|  |  | $L_{max}$ | $TTI_{threshold}$ | $L_{max}$ | $TTI_{threshold}$ |
| FDD |  | F | $Ceil(F/2) - T_{RX}$ | F | $Floor(F/2) - T_{RX}$ |
| TDD M:N |  | M − m | $M - m + n_m - T_{RX}$ | N − n | $N - n + m_n - T_{RX}$ |
| HFDD | DU | M − m | $M - m + (n_m - M) - T_{RX} = -m + n_m - T_{RX}$ | N − n | $N - (n - M) + m_n - T_{RX}$ |
| M:N | UD | N − m | $N - (m - M) + n_m - T_{RX}$ | M − n | $M - n + (m_n - N) - T_{RX}$ | where F denotes the number of subframes constituting one frame, M denotes the number of subframes constituting a DL frame and N denotes the number of subframes constituting a UL frame in a TDD communication system and an HFDD DU communication system, DU denotes a frame structure in which a UL frame is arranged after a DL frame in time in an HFDD communication system, M denotes the number of subframes constituting a UL frame and N denotes the number of subframes constituting a DL frame in an HFDD UD communication system, UD denotes a frame structure in which a DL frame is arranged after a UL frame in time in the HFDD communication system, m denotes a DL subframe index in which data burst transmission starts, $m_n$ denotes a subframe index m in which at least one of ACK and NACK for data burst transmission started in a No. n subframe is transmitted, $n_m$ denotes a subframe index n in which at least one of ACK and NACK for data burst transmission started in a No. m subframe is transmitted, and $T_{RX}$ denotes the number of subframes required for a reception processing time.

15. A transmitter for controlling a Hybrid Automatic Repeat reQuest (HARQ) operation in a wireless mobile communication system using each frame constituted by a plurality of subframes, the transmitter comprising:

put (MIMO), and HARQ schemes capable of being supported by the transmitter and receiver.

19. The transmitter of claim 18, wherein the controller determines to retransmit the data burst at the subframe position indicated by the indication information of the (i+n)-th frame to the receiver when the number of subframes does not exceed the threshold and at least one of the capabilities of the transmitter and receiver does not support retransmission of the data burst at the subframe position indicated by the indication information of the (i+1)-th frame.

20. The transmitter of claim 19, wherein the information about the capability of the transmitter comprises a transmission processing time taken to detect a feedback signal for a data burst transmitted in an i-th frame from the receiver and prepare retransmission of the data burst, and
   the information about the capability of the receiver comprises a reception processing time taken to receive a data burst transmitted in an i-th frame from the transmitter and transmit a feedback signal for the data burst.

21. The transmitter of claim 15, wherein, according to at least one of a Frequency Division Duplex (FDD), a Time Division Duplex (TDD), and a Half-duplex FDD (HFDD) scheme to be used in the wireless mobile communication system, the threshold is determined by:

|  |  | DL |  | UL |  |
|---|---|---|---|---|---|
|  |  | $L_{max}$ | $TTI_{threshold}$ | $L_{max}$ | $TTI_{threshold}$ |
| FDD |  | F | $Ceil(F/2) - T_{RX}$ | F | $Floor(F/2) - T_{RX}$ |
| TDD M:N |  | M − m | $M - m + n_m - T_{RX}$ | N − n | $N - n + m_n - T_{RX}$ |
| HFDD M:N | DU | M − m | $M - m + (n_m - M) - T_{RX} = -m + n_m - T_{RX}$ | N − n | $N - (n - M) + m_n - T_{RX}$ |
|  | UD | N − m | $N - (m - M) + n_m - T_{RX}$ | M − n | $M - n + (m_n - N) - T_{RX}$ | where F denotes the number of subframes constituting one frame, M denotes the number of subframes constituting a DL frame and N denotes the number of subframes constituting a UL frame in a TDD communication system and an HFDD DU communication system, DU denotes a frame structure in which a UL frame is arranged after a DL frame in time in an HFDD communication system, M denotes the number of subframes constituting a UL frame and N denotes the number of subframes constituting a DL frame in an HFDD UD communication system, UD denotes a frame structure in which a DL frame is arranged after a UL frame in time in the HFDD communication system, m denotes a DL subframe index in which data burst transmission starts, $m_n$ denotes a subframe index m in which at least one of ACK and NACK for data burst transmission started in a No. n subframe is transmitted, $n_m$ denotes a subframe index n in which at least one of ACK and NACK for data burst transmission started in a No. m subframe is transmitted, and $T_{RX}$ denotes the number of subframes required for a reception processing time.

22. A receiver for controlling a Hybrid Automatic Repeat reQuest (HARQ) operation in a wireless mobile communication system using each frame constituted by a plurality of subframes, the receiver comprising:

a data burst transmission information reader for reading indication information indicating a subframe position where transmission of a data burst starts and the number of subframes required for transmission of the data burst from a transmitter through an i-th frame and for outputting a read result;

a comparator for comparing the number of subframes with a threshold and for outputting a comparison result; and a controller for determining to receive the data burst retransmitted at the subframe position indicated by indication information of an (i+1)-th frame from the transmitter when the number of subframes does not exceed the threshold, and for determining to receive the data burst retransmitted at the subframe position indicated by indication information of an (i+n)-th frame from the transmitter, where n is a positive integer exceeding 1, when the number of subframes exceeds the threshold.

23. The receiver of claim 22, wherein, when receiving information of a frame in which the data burst is retransmitted from the transmitter, the controller determines to receive a data burst retransmitted at the subframe position indicated by indication information of a corresponding frame according to the received information.

24. The receiver of claim 22, further comprising:

a threshold determiner for exchanging information about capabilities of the transmitter and receiver between the transmitter and receiver and for setting the threshold by considering the capabilities of the transmitter and receiver.

25. The receiver of claim 24, wherein the information about the capabilities of the transmitter and receiver comprise at least one of channel coding, Multiple-Input Multiple-Output (MIMO), and HARQ schemes capable of being supported by the transmitter and receiver.

26. The receiver of claim 25, wherein the controller determines to receive the data burst retransmitted at the subframe position indicated by the indication information of the (i+n)-th frame from the transmitter when the number of subframes does not exceed the threshold and at least one of the capabilities of the transmitter and receiver does not support retransmission of the data burst at the subframe position indicated by the indication information of the (i+1)-th frame.

27. The receiver of claim 26, wherein the information about the capability of the transmitter comprises a transmission processing time taken to detect a feedback signal for a data burst transmitted in an i-th frame from the receiver and prepare retransmission of the data burst, and the information about the capability of the receiver comprises a reception processing time taken to receive a data burst transmitted in an i-th frame from the transmitter and transmit a feedback signal for the data burst.

28. The receiver of claim 22, wherein, according to at least one of a Frequency Division Duplex (FDD), a Time Division Duplex (TDD), and a Half-duplex duplex FDD (HFDD) scheme to be used in the wireless mobile communication system, the threshold is determined by:

|  |  | DL |  | UL |  |
|---|---|---|---|---|---|
|  |  | $L_{max}$ | $TTI_{threshold}$ | $L_{max}$ | $TTI_{threshold}$ |
| FDD |  | F | $Ceil(F/2) - T_{RX}$ | F | $Floor(F/2) - T_{RX}$ |
| TDD M:N |  | M − m | $M - m + n_m - T_{RX}$ | N − n | $N - n + m_n - T_{RX}$ |
| HFDD M:N | DU | M − m | $M - m + (n_m - M) - T_{RX} = -m + n_m - T_{RX}$ | N − n | $N - (n - M) + m_n - T_{RX}$ |
|  | UD | N − m | $N - (m - M) + n_m - T_{RX}$ | M − n | $M - n + (m_n - N) - T_{RX}$ | where F denotes the number of subframes constituting one frame, M denotes the number of subframes constituting a DL frame and N denotes the number of subframes constituting a UL frame in a TDD communication system and an HFDD DU communication system, DU denotes a frame structure in which a UL frame is arranged after a DL frame in time in an HFDD communication system, M denotes the number of subframes constituting a UL frame and N denotes the number of subframes constituting a DL frame in an HFDD UD communication system, UD denotes a frame structure in which a DL frame is arranged after a UL frame in time in the HFDD communication system, m denotes a DL subframe index in which data burst transmission starts, $m_n$ denotes a subframe index m in which at least one of ACK and NACK for data burst transmission started in a No. n subframe is transmitted, $n_m$ denotes a subframe index n in which at least one of ACK and NACK for data burst transmission started in a No. m subframe is transmitted, and $T_{RX}$ denotes the number of subframes required for a reception processing time.

\* \* \* \* \*